(12) United States Patent
Leppanen et al.

(10) Patent No.: US 7,181,254 B2
(45) Date of Patent: Feb. 20, 2007

(54) DUAL-POSITION RADIO DEVICE WITH LIGHT SOURCE

(75) Inventors: Jari Leppanen, Nokia (FI); Paavo Pietola, Helsinki (FI)

(73) Assignee: Nokia Corporation, Espoo (FI)

( * ) Notice: Subject to any disclaimer, the term of this patent is extended or adjusted under 35 U.S.C. 154(b) by 645 days.

(21) Appl. No.: 10/433,624

(22) PCT Filed: Dec. 21, 2000

(86) PCT No.: PCT/FI00/01137

§ 371 (c)(1),
(2), (4) Date: Jun. 18, 2003

(87) PCT Pub. No.: WO02/51107

PCT Pub. Date: Jun. 27, 2002

(65) Prior Publication Data

US 2004/0014487 A1    Jan. 22, 2004

(51) Int. Cl.
*H04B 1/38* (2006.01)
(52) U.S. Cl. .................. 455/575.1; 455/556.1; 455/556.2; 455/573
(58) Field of Classification Search ............ 455/556.1, 455/556.2, 573, 575.1, 557, 575.6
See application file for complete search history.

(56) References Cited

U.S. PATENT DOCUMENTS 5,333,176 A * 7/1994 Burke et al. ............... 455/557
5,734,262 A * 3/1998 Saito et al. ................. 324/95
6,735,450 B1 * 5/2004 Remmert ................. 455/550.1

FOREIGN PATENT DOCUMENTS

| DE | 29912688 | 10/1999 |
|---|---|---|
| GB | 2346287 | 8/2000 |

* cited by examiner

*Primary Examiner*—Matthew Anderson
*Assistant Examiner*—Tuan Pham
(74) *Attorney, Agent, or Firm*—Banner & Witcoff, Ltd.

(57) ABSTRACT

A wall-mountable and desk-mountable radio device comprising a base (20) and a radio unit (10), inside of which radio unit is an antenna integrated on a circuit board (30) and a group of indicator lamps (32). The cover of the radio unit is provided with first openings (14), and the base comprises corresponding photoconductors (24), which narrowly fit into the first openings (14). The cover of the radio unit is also provided with one or more second holes (18), into which the photoconductors (24) fit narrowly. The indicator lamps (32) are arranged at the first openings (14). The second openings (18) are arranged so that, threaded therein, the photoconductors (24) are placed above the first openings (14), and so the photoconductors (24) receive the indicator lights in both desk and wall installations. The photoconductors are provided with a bevelled surface (26) for turning the indicator light obliquely downward in wall installation and obliquely upward, towards the eyes of the user, in desk installation.

Figure 1:
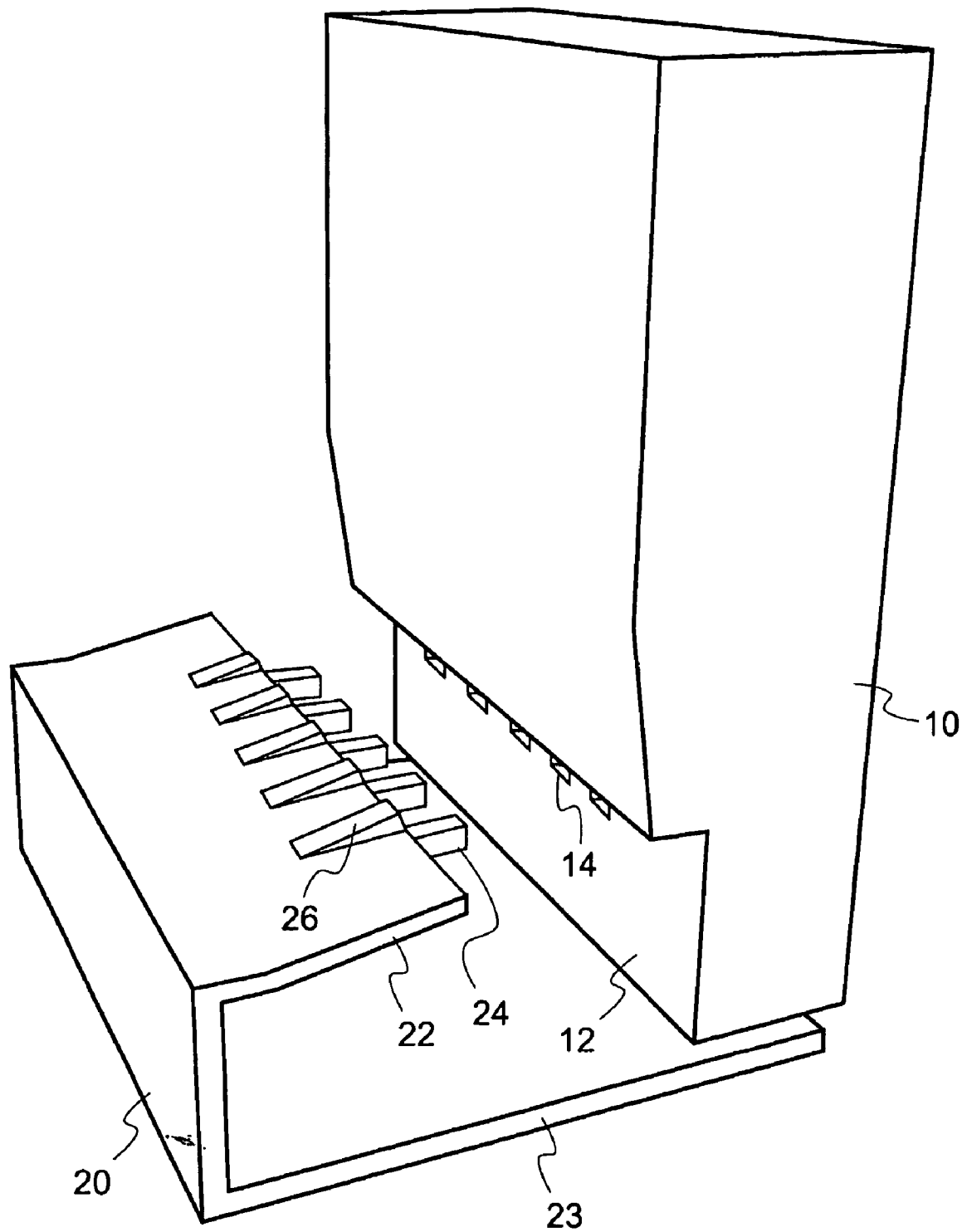

20 Claims, 5 Drawing Sheets

DUAL-POSITION RADIO DEVICE WITH LIGHT SOURCE

This is a U.S. National Phase Application Under 35 USC 371 and applicants herewith claim the benefit of priority of PCT/FI00/01137 filed Dec. 21, 2000, which was published Under PCT Article 21(2) in English.

The present invention relates to radio devices, particularly dual-position radio devices.

Modern homes may have a plurality of various radio devices, such as mobile stations, wireless telephones, and as a newcomer, radio access point devices constituting a wireless Internet radio interface. Base stations and radio access point devices of wireless telephones are relatively permanently mountable in a given location. They are typically mountable in a vertical position on a wall or in a horizontal position on a desk.

For arranging a better radio coverage, the base stations of wireless telephones often comprise a turnable and extractable telescopic antenna, which is turnable to an upright position irrespective of the position of the base station. A telescopic antenna is also previously known to most users. However, a telescopic antenna is susceptible to bending and breaking, and soldered joints are often made manually during the assembly of the antenna. A telescopic antenna also comprises moving parts. A telescopic antenna extending from a base station may complicate the placement of the base station in an otherwise suitable location. In this case the consumer who acquired the wireless telephone easily leaves the antenna against the side of the base station, whereby the audibility naturally somewhat deteriorates. Wireless telephones often use frequencies below 50 MHz, whereby the audibility may remain reasonable irrespective of the wrong position of the antenna. A radio signal below 50 MHz still 'bends' relatively well compared with for example radio access point devices operating at a frequency exceeding 2,000 MHz.

An antenna provided on the circuit board of a device is considerably more inexpensive than a telescopic antenna and can be made fully automatically, i.e. it is suitable for mass production. An antenna provided on a circuit board is also covered inside a device. On the other hand, mounting the device on a wall or a desk causes the antenna to end up in various positions, whereby the radiation field generated by the antenna also turns in different directions. The disadvantage may prevent the use of directional antennas in devices mountable on walls and desks.

New low power radio frequency systems (LPRF) have been suggested as a provider of a communication connection for several LPRF devices in its vicinity. Bluetooth technology is an example of LPRF. Bluetooth is a widely known technology operating at a free frequency range in the domain of 2.45 GHz. This frequency band is usable worldwide and the range of systems operating at the band is typically 10 metres at normal power. Bluetooth can be applied to various types of devices to allow them to communicate with other devices.

A micro-cell cellular, mainly indoor, network can be implemented for Bluetooth devices. Such a network comprises some Bluetooth base stations and a host server that controls the base stations. Since the network is intended for home and office use, it has to be economic and easily installable. Bluetooth base stations should preferably be freely placeable on desks, shelves or walls, for example.

The above devices often comprise indicator lamps. The indicator lamps are typically LED lights (Light Emitting Diode), for which openings are provided in a cover of the base station and which protrude to some extent from their openings allowing the user to see the light emitted from the LED. However, the procedure has drawbacks: a mechanical fastening for the LEDs has to be arranged inside the device in the vicinity of the outer cover of the device, and electricity has to be conducted to them for their use. The most inexpensive way is to solder the LEDs onto a circuit board arranged close to the outer cover of the device. However, this is not always possible, particularly when aesthetic considerations are taken into account in the design of the cover of the device and technical restrictions are to be avoided. Aligning the LEDs to their openings may also require special carefulness in the assembly, and involves a risk of failure. If the LED is not aligned with the opening, it easily bends under the cover and in the worst case its legs may cause a short circuit. Openings provided for LEDs may also be perceived as a sign of old-fashioned technology. The finish of a device is indeed often improved by gluing a transparent plastic plate onto the openings, rendering the outer surface of the device uniform. This also facilitates cleaning of the device, since its surface does not comprise narrow sharp-edged recesses that easily attract dirt and dust. On the other hand, a recess must be provided in the cover for said transparent plastic plate, and the plastic plate has to be fastened to the recess (for example by gluing). This increases the number of working steps that require accuracy and in which failure may ruin the appearance of the device and render it unsuitable for a consumer.

In accordance with a first aspect of the invention, a radio device is provided, comprising:
  a body defining a space inside thereof and at least one opening; and
  at least one light source for emitting light, placed in said space at the at least one opening provided in the body;
characterized in that the radio device further comprises:
  a part to be fastened to the body;
  at least one photoconductor fitted to the part to be fastened to the body; and
  that the part to be fastened to the body is fitted to be attached to the body by means of the photoconductor so that the photoconductor settles at said at least one opening and at least partly outside said space.

In accordance with a second aspect of the invention, the same photoconductor is usable both for conducting light from the light source to the outside of the radio device and for fastening the part to be fastened to the body. The part to be fastened to the body is preferably a support device for supporting the radio device in the desired position.

In accordance with the second aspect of the invention, a radio device is provided, comprising:
  a body defining a space inside thereof and at least one opening; and
  at least one light source for emitting light, placed at the at least one opening provided in the body;
characterized in that the radio device further comprises:
  a support device for supporting the body in the desired position, the body being fitted to be fastened to the support device at least two different angles with respect to the support device; and
  at least one photoconductor fitted to the support device, the photoconductor being arranged to settle at the at least one opening defined by the body when the support device is fastened to the body, for conducting the light emitted by said at least one light source via the photoconductor to the outside of the radio device.

Preferably, said light source is an indicator lamp.

Preferably said part to be fastened to the body is fitted to be fastened with a quick fastener. This allows rapid fastening without tools.

The radio device of the invention is preferably installable on either a horizontal or a vertical surface. The same indicator lamp and photoconductor may be used to give signals to the user. Owing to the photoconductor, the indicator lamp need not be fitted to any narrow opening in the body, but the indicator lamp is placeable loosely and the light can be conducted into sight with the photoconductor.

Preferably the radio device also comprises at least one circuit board in the space inside the body and that said at least one light source is installed on the circuit board.

The antenna of the radio device of the invention can be manufactured directly on the circuit board, whereby it is inexpensive and suitable for mass production.

Preferably the photoconductor comprises an end fitted placeable in said opening for fastening the body at a first angle to the support device and for receiving light to the photoconductor from the light source.

Fitting the end of the photoconductor to said opening simultaneously fastens the body at the first angle to the support device and places the end in the vicinity of the light source allowing the photoconductor to receive light from the light source.

Preferably the body also comprises a fastening part, the fastening part being fitted to attach to the photoconductor for fastening the body to the support device at a second angle, and the fastening part being fitted to direct the photoconductor at said opening for receiving light from the light source to the photoconductor via the opening.

The fastening part both fastens the body to the support device at the second angle and guides the photoconductor to the opening for receiving light from the light source. This way light is received to the photoconductor from the same light source irrespective of at which of the first and second angles the body is fastened with respect to the support device.

A support device allows the radio device to be preferably placed in the same position when placed on a horizontal and a vertical surface. This ensures that the antenna is in the correct position.

Preferably the antenna is directional so that the maximum of its radiation pattern is substantially on the horizontal plane. Such an antenna is well suitable for use when the position of the antenna remains substantially the same irrespective of the location of the radio device.

Installing at least one light source directly onto a circuit board and making it visible through an opening in the body and a photoconductor according to the invention provides several advantages. Installing light sources on a circuit board is well suitable for mass production, since the light sources do not have to be separately fastened to the body and wires do not have to be drawn from there to coupling points on the circuit board. When a photoconductor is used, said at least one opening serves to let out light from the light source to the photoconductor, but the light source does not have to be flush with the opening. Accordingly, alignment of the light sources is not nearly as critical as if they were placed in confined openings in the cover of the body.

Preferably a recess is provided in the body for the photoconductor so that the photoconductor settles substantially flush with the surface of the body at least when the radio device is placed on either a horizontal or a vertical surface. This way a neat and presentable appearance is obtained for the radio device, and the outer surface of the radio device is easy to keep clean. Preferably the side view of the photoconductor is conical such that at least one indicator light of the radio device slopes downwards in a wall installation and upwards in a desk installation.

The support device is preferably made from a transparent material, such as plastic or glass, so that the photoconductor constitutes an integrated part of the support device.

Preferably the body is fitted to be detachably attachable to the support device. Preferably the body is fitted to be fastened with a friction joint. Preferably the support device comprises a number of protruding photoconductors, and the body comprises corresponding cavities for fastening the support device to the body. This allows a home user, for example, to easily couple the support device to the body of the radio device at the desired angle for placement on a horizontal or vertical surface. The support device preferably comprises grooves fitted to a screw head for fastening the support device to a wall.

In accordance with a third aspect of the invention, a method is provided for displaying light with a radio device comprising a body defining a space inside thereof and at least one opening, the method comprising the steps of:

fastening to the body a part to be fastened to the body and comprising a photoconductor so that the photoconductor settles at said at least one opening and at least partly outside said space;

emitting light in said space towards said at least one opening;

conducting said light via at least one photoconductor to the outside of the radio device; and using the photoconductor for fastening to the body the part to be fastened to the body.

In accordance with a fourth aspect of the invention, a method is provided for displaying light with a radio device comprising a body defining a space inside thereof and at least one opening, the method comprising the steps of:

fastening the body to a desired position in a support device in which at least one photoconductor is fitted such that the photoconductor settles at the at least one opening defined by the body;

supporting the body with the support device to the desired position; emitting light in said space;

conducting said light via the photoconductor to the outside of the radio device.

Figure 2:
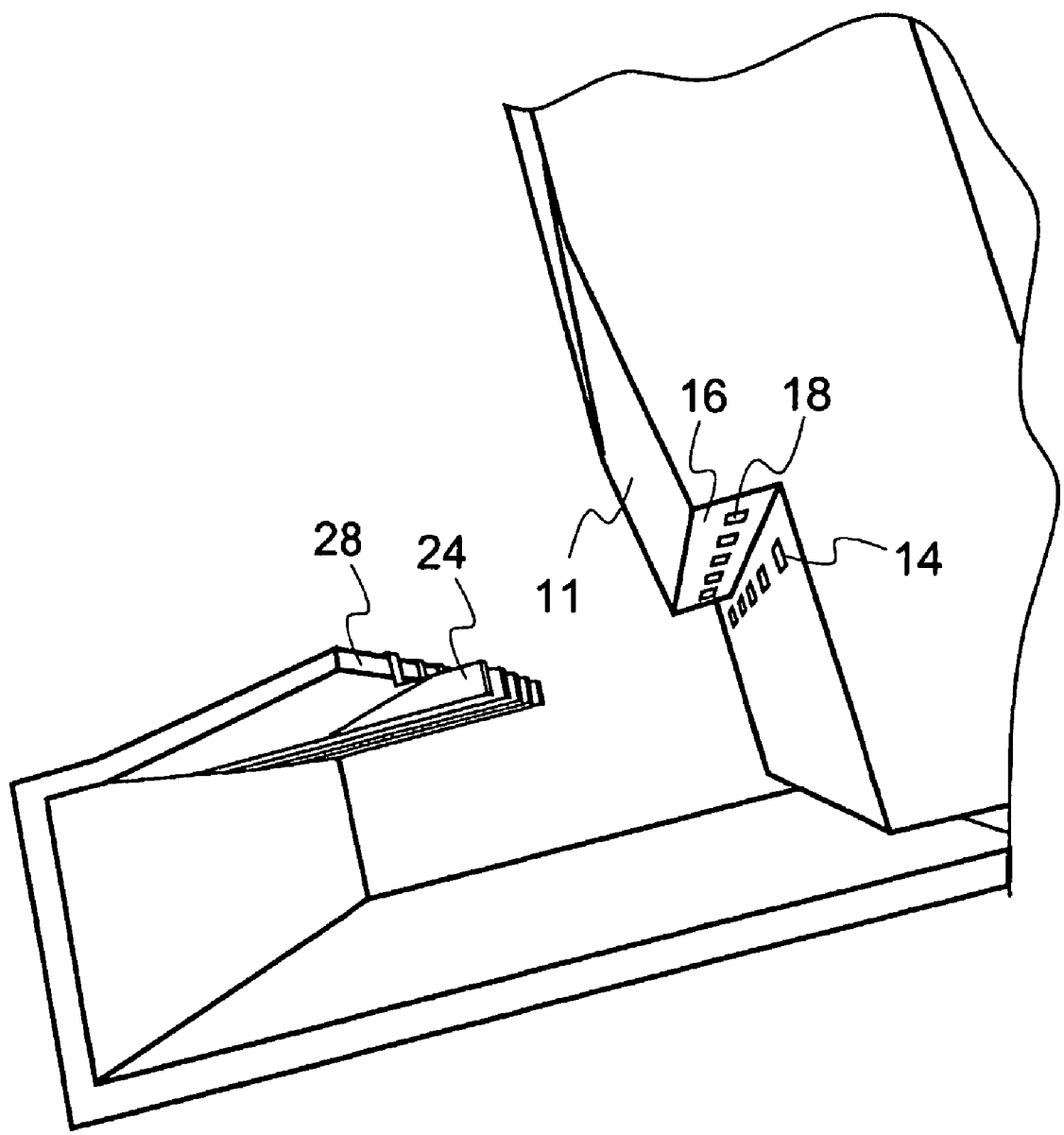
Figure 3:
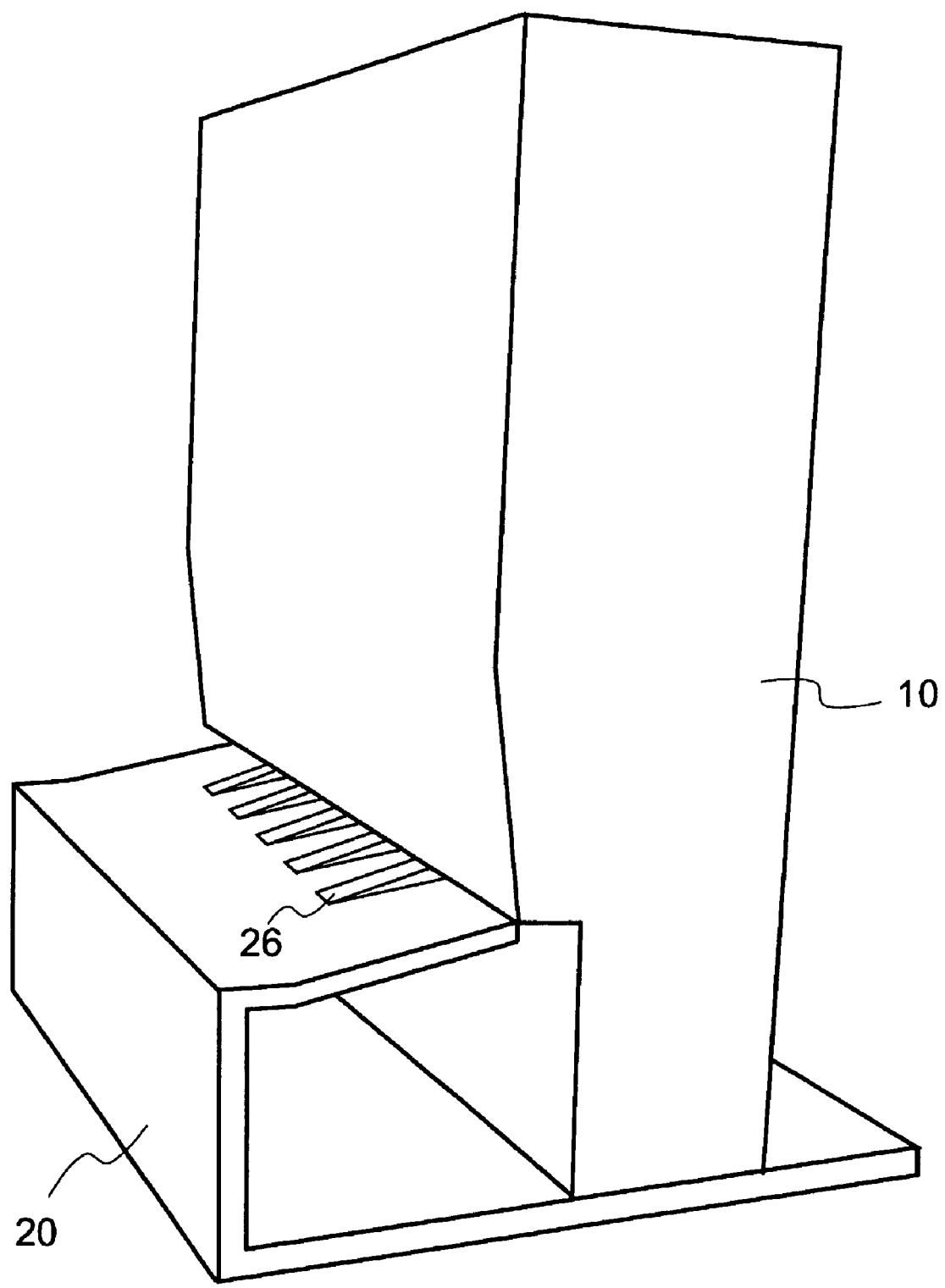
Figure 4:
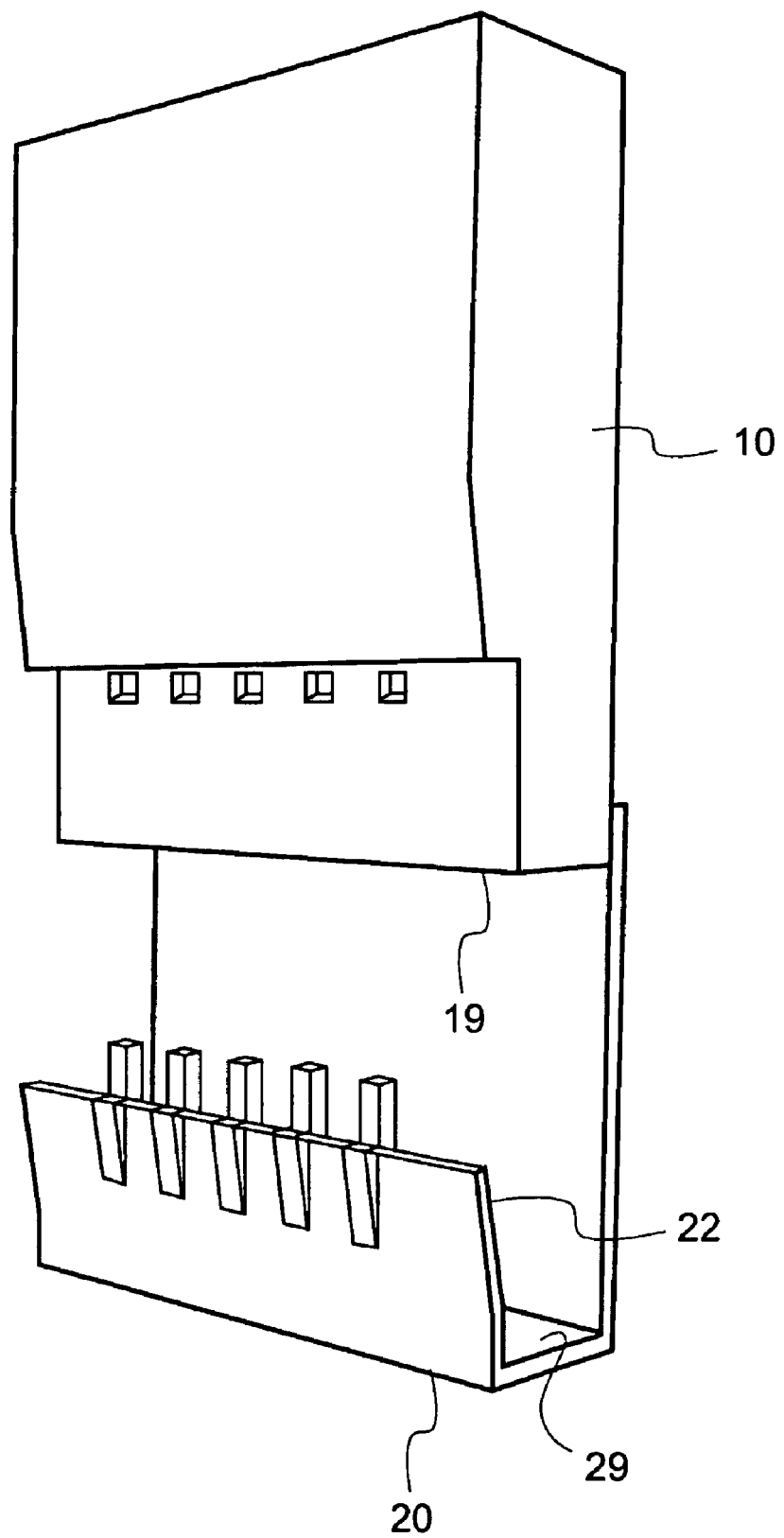
Figure 5:
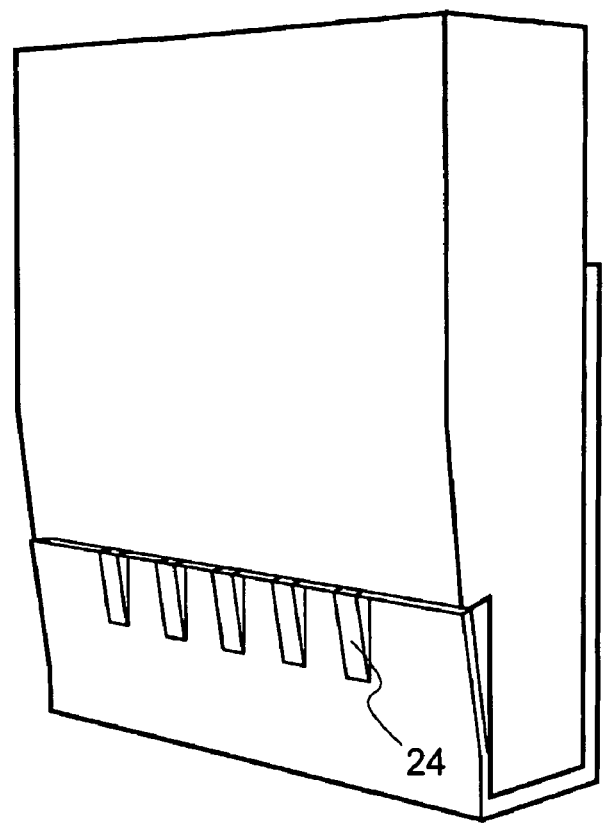
Figure 6:
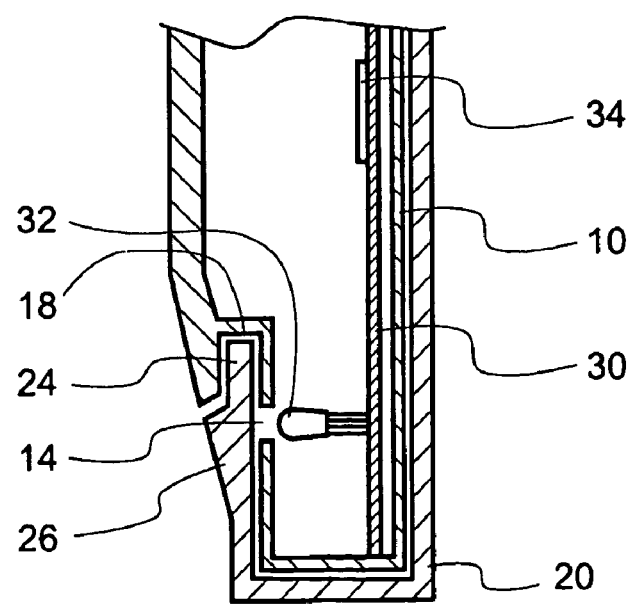

In the following, the invention will be described by way of example with reference to the accompanying drawings, in which:

FIGS. 1 to 3 show a first configuration of an embodiment of the invention; and FIGS. 4 to 6 show a second configuration of an embodiment of the invention.

FIG. 1 shows a first configuration of an embodiment of the invention, wherein a base station unit 10 is being coupled to a base 20 in a first position. The base station unit 10 is a Bluetooth radio access point device operating at a frequency of about 2.45 GHz. The base station unit 10 is approximately in the shape of a tile, its dimensions (length×width×depth) being 10×8×5 cm. The base station unit 10 is fitted to be used in the upright position and the base 20 is fitted to support the base station unit to the right position both in wall and in desk installations.

One lateral surface of the base station unit 10 is provided with a thinned part having an about 1-cm deep recess of the width of the entire unit. The recess is defined by the end of the base station unit and extends to about 3 cm from it. At the recess, the surface of the thinned lateral surface, i.e. bottom 12, forms, at a distance from the end of the base station unit, an array of openings having five rectangular first openings 14 grouped at uniform intervals.

The base 20 comprises a photoconductor part 22 and a background part 23. The base serves to support the base station unit 10 to its position of use (in this example upright) when the base station unit is being installed on a wall or desk according to the user's choice. A radio access point device should be installed once in a suitable place in a set of rooms, after which it is not necessarily moved at all, or moved only when refurnishing or when there is a need to change the coverage area of the radio access point device.

The background part 23 is a plate intended to serve as a support surface for desk installation of the base station unit and as a wall mounting plate for wall installation. The photoconductor part 22 comprises five photoconductor bars 24 having a rectangular profile. The photoconductor bars are substantially parallel and in line with the level of the background part, at an about 4-cm distance from the level of the background part. The photoconductor bars 24 are of transparent plastic and they are fitted to settle narrowly in the first openings 14. The photoconductor bars comprise two ends: an end fitted to settle narrowly in the openings and a wedge part 26, which is fitted to penetrate the surface of the photoconductor part and whose structure and operation will be described later.

FIG. 2 is another view of the configuration of FIG. 1. FIG. 2 shows an end 28 of the photoconductor part and a body counter surface 11, i.e. a wall beside the recess, against which wall the end 28 rests when the body is coupled to the base (see FIG. 3). FIG. 2 also shows the surfaces of the thinned lateral side of the base station unit. A cutting face 16 of the recess constitutes a second row of openings, comprising five rectangular second openings 18 grouped at uniform intervals, in the same way as the photoconductor bars 24. The second row of openings is intended for a second configuration shown in FIGS. 4 to 6.

FIG. 2 also shows that the photoconductor bars extend from the end 28 such a distance that, in the configuration of FIG. 3, the photoconductor bars extend through the first openings 14, but do not extend too far inside the first openings so that the photoconductor bars 24 could harm the indicator lamps inside the body. The photoconductor bars are also fastened by friction to the body at the first openings 14.

FIG. 3 shows the configuration of FIG. 1 with the base station unit 10 fastened to the base 20. The photoconductor bars 24 of the base are inserted in the first openings 14. The photoconductor bars lock the base station unit with respect to the base so that the base station unit stands better when arranged on the horizontal plane with the base 20. FIG. 3 also shows that the wedge part 26 of the photoconductor bars 24 forms a light surface sloping downwards away from the base station unit. In this first configuration, the wedge part serves to conduct light via a photoconductor from the base station unit on a desk towards the eyes of a user standing in the vicinity or seated at a desk.

FIG. 4 shows a second configuration according to an embodiment of the invention. The base 20 is turned to the upright position such that the background part 23 settles behind the base station unit 10. When the base station unit 10 is lowered, the photoconductor part 22 settles onto the recess of the base station unit. An end plate 29 that settles against the end 19 of the base station unit is arranged between the background part and the photoconductor part.

FIG. 5 shows a second configuration of FIG. 4 with the base station unit 10 coupled to the base 20. The base station unit is preferably placed high up, e.g. at 2 metres, and fastened to the wall of a room. When placed high up, the base station unit has an unobstructed connection to the radio devices in its vicinity, since furniture and domestic appliances often remain below the straight line between the base station and the radio device using it.

On the other hand, when the base station unit is placed high up, the indicator lights radiating straight ahead would be poorly visible, but the photoconductors 26 turn the indicator lights obliquely downward so that they are better visible to a user in the vicinity of the base station unit. The base 20 is intended to be fastened to the wall before the base station unit is fitted to the base. This allows easy and safe wall installation of the base station unit.

FIG. 6 is a cross-section of the base station unit 10 and the base 20 of FIG. 5 at a photoconductor 24. The photoconductor bar 24 is inserted in a second opening 18. A circuit board 30 is arranged inside the base station unit 10. A directional laterally radiating surface antenna 34 is arranged on the circuit board. A light source 32, e.g. a LED lamp or a laser diode, is fastened to the circuit board in the vicinity of the first opening 14. Light from the light source 32 propagates through the first opening 14 beyond the wedge part 26 of the photoconductor bar, is immersed in the wedge part and deflected from the wedge part obliquely downwards as was described above in connection with FIG. 5. Similarly, in the first configuration the end of the photoconductor bar 24 settles in the immediate vicinity of the light source 32 and conducts light from the light source to the wedge part, from which the light is deflected obliquely upwards as was described above in connection with FIG. 3.

FIG. 6 also shows that the second openings 18 serve as fastening parts for locking the photoconductors to the body. Instead of openings, in alternative embodiments the body comprises tight guides, slots and other holders for the photoconductors for fastening the photoconductors to the body.

For example the keys or the display of a radio device may also be illuminated in accordance with the invention. However, the invention is particularly useful in displaying indicator lights, since in that case several independent lights have to be displayed.

The implementation and the embodiments of the invention were discussed herein by means of examples. It is apparent to a person skilled in the art that the invention is not restricted to the details of the embodiments presented above and that the invention may be implemented in another form without deviating from the characteristics of the invention. For example the number and shape (profile) of the photoconductor bars 24 may be changed, a rigid band or a steel wire loop may replace the background part and/or end plate. The size and shape of the radio device (base station unit) may also vary from what was described above. Thus the embodiments presented should be seen as illustrative, not restrictive. The implementation and use of the invention are only limited by the attached claims. Thus the different embodiments of the invention, including equivalent embodiments, as defined by the claims, are within the scope of the invention.

The invention claimed is:

1. A radio device comprising:
   a body defining a space inside thereof and at least one opening; at least one light source for emitting light, placed in the space at the at least one opening provided in the body;
   a part configured to be fastened to the body; and
   at least one photoconductor fitted to the part; wherein the part is fitted to be attached to the body by the photoconductor so that the photoconductor settles at the at least one opening and at least partly outside the space, and wherein the photoconductor is shaped such that it turns the emitted light from the at least one light source obliquely downward in wall installation and obliquely upwards in desk installation of the radio device while arranging the body in a substantially same position.

2. The radio device in claim 1, wherein the part configured to be fastened to the body is fitted to be fastened with a quick fastener.

3. The radio device in claim 1, comprising at least one circuit board in the space inside the body, wherein the at least one light source is installed on the circuit board.

4. The radio device in claim 1, comprising an antenna, the antenna being arranged substantially directional in the horizontal direction.

5. The radio device in claim 4, wherein the antenna is arranged on the circuit board.

6. The radio device in claim 1, wherein the body comprises a recess for the photoconductor so that the photoconductor settles substantially flush with level of the body.

7. The radio device in claim 1, wherein the radio device is a radio access point device.

8. The radio device in claim 1, wherein the at least one light source comprises an indicator lamp.

9. A radio device comprising:
a body defining a space inside thereof and at least one opening;
at least one light source for emitting light, placed at the at least one opening provided in the body;
a support device configured to support the body in the desired position, the body being fitted to be fastened to the support device at least two different angles with respect to the support device; and
at least one photoconductor fitted to the support device, the photoconductor being arranged to settle at the at least one opening defined by the body when the support device is fastened to the body, and for conducting the light emitted by the said-at least one light source via the photoconductor to the outside of the radio devices, wherein the photoconductor is shaped such that the light emitted by the at least one light source is turned obliquely downward in wall installation and obliquely upwards in desk installation of the radio device while arranging the body in a substantially same position.

10. The radio device in claim 9, comprising at least one circuit board in the space inside the body, wherein the at least one light source is installed on the circuit board.

11. The radio device in claim 9, comprising an antenna, the antenna being arranged substantially directional in the horizontal direction.

12. The radio device in claim 11, wherein the antenna is arranged on the circuit board.

13. The radio device in claim 9, wherein the photoconductor comprises an end fitted to be arranged in the opening for fastening the body at a first angle to the support device and for receiving light from the light source to the photoconductor.

14. The radio device in claim 9, wherein the support device is made of a transparent material so that the photoconductor constitutes an integrated part of the support device.

15. The radio device in claim 9, wherein the body is fitted to be detachably attached to the support device.

16. The radio device in claim 9, wherein the support device comprises a number of protruding photoconductors and the body comprises corresponding openings for fastening the support device to the body.

17. The radio device in claim 9, wherein the support device comprises grooves fitted to a screw head for fastening the support device to a wall with screw fastening.

18. A radio device comprising:
a body defining a space inside thereof and at least one opening;
at least one light source for emitting light, placed at the at least one opening provided in the body;
a support device configured to support the body in the desired position, the body being fitted to be fastened to the support device at least two different angles with respect to the support device; and
at least one photoconductor fitted to the support device, the photoconductor being arranged to settle at the at least one opening defined by the body when the support device is fastened to the body, and for conducting the light emitted by the at least one light source via the photoconductor to the outside of the radio device;
wherein the body comprises a fastening part, the fastening part being fitted to be fastened to the photoconductor for fastening the body to the support device at a second angle, and
the fastening part is fitted to direct the photoconductor at the opening for receiving light from the at least one light source to the photoconductor via the opening.

19. A method of displaying light with a radio device comprising a body defining a space inside thereof and at least one opening, the method comprising:
fastening to the body a part configured to be fastened to the body and comprising at least one photoconductor such that the photoconductor settles at the at least one opening and at least partly outside the space;
emitting light in the space towards the at least one opening; conducting the emitted light via the photoconductor to the outside of the radio device, wherein the emitted light is turned obliquely downward in wall installation and obliquely upwards in desk installation of the radio device while arranging the body in a substantially same position; and
using the photoconductor to fasten the part to the body.

20. A method of displaying light with a radio device comprising a body defining a space inside thereof and at least one opening, the method comprising:
fastening the body to a desired position in a support device in which at least one photoconductor is arranged such that the photoconductor settles at the at least one opening defined by the body;
supporting the body with the support device to the desired position;
emitting light in the space;
conducting the light via the photoconductor to the outside of the radio device, wherein the light is turned obliquely downward in wall installation and obliquely upwards in desk installation of the radio device while arranging the body in a substantially same position.

* * * * *